United States Patent
Severinsson et al.

(10) Patent No.: US 8,672,790 B2
(45) Date of Patent: Mar. 18, 2014

(54) DEVICE FOR TORQUE VECTORING

(75) Inventors: Lars Severinsson, Hishult (SE); Kristoffer Nilsson, Malmo (SE)

(73) Assignee: BorgWarner TorqTransfer Systems AB (SE)

( * ) Notice: Subject to any disclaimer, the term of this patent is extended or adjusted under 35 U.S.C. 154(b) by 0 days.

(21) Appl. No.: 13/225,143

(22) Filed: Sep. 2, 2011

(65) Prior Publication Data

US 2012/0083378 A1 Apr. 5, 2012

Related U.S. Application Data (63) Continuation of application No. PCT/SE2010/050066, filed on Jan. 25, 2010.

(30) Foreign Application Priority Data

| Mar. 5, 2009 | (SE) | 0950125 |
| Oct. 12, 2009 | (SE) | 0901310 |
| Jan. 12, 2010 | (SE) | 1000027 |

(51) Int. Cl.
*F16H 48/30* (2012.01)

(52) U.S. Cl.
USPC ............................... 475/5; 475/150

(58) Field of Classification Search
USPC ............ 475/5, 149, 150, 204, 205, 219, 248; 477/3, 7; 180/6.44
See application file for complete search history.

(56) References Cited

U.S. PATENT DOCUMENTS

| 4,998,591 | A * | 3/1991 | Zaunberger | 180/6.44 |
| 7,326,141 | B2 * | 2/2008 | Lyons et al. | 475/28 |
| 7,500,931 | B2 * | 3/2009 | Rosemeier et al. | 475/5 |
| 7,500,933 | B2 * | 3/2009 | Baasch et al. | 475/205 |
| 2004/0069542 | A1 | 4/2004 | Simmons et al. | |
| 2004/0220011 | A1 | 11/2004 | Gumpoltsberger et al. | |
| 2006/0030974 | A1 * | 2/2006 | Tsukasaki et al. | 701/1 |

(Continued)

FOREIGN PATENT DOCUMENTS

| EP | 1850035 A2 | 10/2007 |
| JP | H04321435 A | 11/1992 |

(Continued)

OTHER PUBLICATIONS

International Preliminary Report on Patentability; Application No. PCT/SE2010/050066; Issued: May 12, 2011; 11 pages.

(Continued)

*Primary Examiner* — Roger Pang
(74) *Attorney, Agent, or Firm* — St. Onge Steward Johnston & Reens LLC (57) ABSTRACT

A device for torque vectoring in a wheeled vehicle is presented. The device includes a differential mechanism arranged on an axle having a first drive shaft and a second drive shaft, an electrical power source connected to an electrical motor, the electrical motor being connectable to the axle for torque vectoring between the first drive shaft and the second drive shaft, and control means connected to the power source and configured to receive a plurality of variables representing the current vehicle state and to determine drive currents being dependent on the variables, wherein the drive currents are supplied to the electrical motor from the power source for introducing a torque increase to either one of the first or second drive shafts and a corresponding torque decrease to the other one of the first or second drive shafts.

4 Claims, 6 Drawing Sheets

(56) References Cited

U.S. PATENT DOCUMENTS

| | | | |
|---|---|---|---|
| 2006/0154773 A1* | 7/2006 | Dupriez | 475/5 |
| 2006/0162980 A1 | 7/2006 | Bowen | |
| 2006/0276292 A1* | 12/2006 | Puiu | 475/205 |
| 2006/0293141 A1* | 12/2006 | Sharma et al. | 475/204 |
| 2007/0015618 A1* | 1/2007 | Baasch et al. | 475/5 |
| 2007/0243965 A1 | 10/2007 | Ordo et al. | |
| 2007/0249456 A1 | 10/2007 | Meixner | |
| 2008/0064552 A1 | 3/2008 | Tangl | |
| 2008/0300084 A1* | 12/2008 | Thompson | 475/150 |
| 2010/0137095 A1* | 6/2010 | Baasch et al. | 475/150 |

FOREIGN PATENT DOCUMENTS

| | | |
|---|---|---|
| JP | 2000355227 A | 12/2000 |
| JP | 2001039179 A | 2/2001 |
| JP | 2003113874 A | 4/2003 |
| JP | 2004332935 A | 11/2004 |
| JP | 2005001633 A | 1/2005 |
| JP | 2008189053 A | 8/2008 |
| WO | 2006060139 A2 | 6/2006 |

OTHER PUBLICATIONS

International Search Report; Application No. PCT/SE2010/050066; Issued: Jun. 16, 2010; 4 pages.

Notice of Reasons for Rejection from the Japanese Patent Office, Application No. 2011-552907, Transmission Date: Nov. 22, 2013, 2 pages.

\* cited by examiner

DEVICE FOR TORQUE VECTORING

CROSS-REFERENCE TO RELATED APPLICATIONS

The present application is a continuation of pending International patent application PCT/SE2010/050066 filed on Jan. 25, 2010 which designates the United States and claims priority from Swedish patent application Nos. 1000027-1 filed on Jan. 12, 2010, 0901310-3 filed on Oct. 12, 2009, and 0950125-5 filed on Mar. 5, 2009, the content of which is incorporated herein by reference.

FIELD OF THE INVENTION

The present invention relates to a device for torque vectoring. More particularly, the present invention relates to a device for applying a torque difference between first and second drive shafts of an axle of a wheeled vehicle.

BACKGROUND OF THE INVENTION

In a road vehicle, especially a car, it is advantageous to be able to freely distribute drive torque to different wheels in order to enhance the driving dynamics of the vehicle. Devices for accomplishing this desired result are in the art referred to as torque vectoring devices.

Torque vectoring devices may be used in either two-wheel drive vehicles or four-wheel drive vehicles, although the latter case must presently be regarded as more common. It can also be used for either rear or front drive shafts or in the cardan shaft for distributing torque between the front and rear drive shafts.

In order to obtain the desired result with regard to the driving dynamics, it may in certain situations be advantageous to provide a drive wheel with a positive torque in relation to the other drive wheel on the driving axle. Such a positive torque may be obtained in a way known per se by a mechanical gear device for gearing-up or increasing the rotational speed of the drive shaft for the wheel in question by for example 10%.

Many examples of such mechanical gear devices are known. In such arrangements being both heavy and expensive, torque vectoring devices are arranged at either side of the central differential for the two drive shafts.

Hence, when a differential rotational speed between two wheels is requested the prior art devices are affecting the rotational speed relative the absolute rotational speed, leading to heavy devices having a relatively high power consumption.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a device according to the appended patent claims.

It is an object of the invention to provide a torque vectoring device, which overcomes the above mentioned problems.

A further object of the present invention is to provide an efficient torque vectoring device being configured to be implemented in a modern vehicle.

Moreover, an object of the present invention is to provide a torque vectoring device which has a significantly reduced size and energy consumption.

According to an aspect, a device for torque vectoring in a wheeled vehicle is provided. The device comprises a differential mechanism arranged on an axle having a first drive shaft and a second drive shaft, an electrical power source connected to an electrical motor, said electrical motor being connectable to said axle for torque vectoring between said first drive shaft and said second drive shaft, and control means connected to said power source and configured to receive a plurality of variables representing the current vehicle state and to determine drive currents being dependent on said variables. Said drive currents are supplied to said electrical motor from said power source for introducing a torque increase to either one of said first or second drive shafts and a corresponding torque decrease to the other one of said first or second drive shafts. This is advantageous in that the device may be made relatively small, as it requires the electrical motor to only operate at a rotational speed being proportional to the differential rotational speed, instead of at a rotational speed being proportional to the absolute rotational speed.

Said electrical power source may comprise an accumulator, and said control means may comprise a vehicle communication network configured to collect the plurality of variables, a controller configured to receive said variables and calculate one or more control signals, and a power electronics unit configured to receive said one or more control signals and to control the energy flow between the accumulator and the electrical motor by supplying said drive currents via the accumulator. Hence, the device may be used for real time state detection such that the device may be used as a tractive enhancement feature on surfaces having inhomogeneous friction.

The device may further comprise an electrical propulsion motor arranged to drive said axle. This is advantageous in that a common electrical system may be used for the electrical motor and the propulsion motor, thus reducing size and complexity of the device.

The electrical propulsion motor may be arranged at said axle such that a rotor of said electrical propulsion motor is rotating around the axis of said axle. Hence, no components are necessary for transmitting torque to the axle leading to a more compact device.

The differential mechanism may comprise a differential, which is advantageous in that readily available components may be used, and the electrical motor may be connected to the first drive shaft and said second drive shaft by means of a planetary gear set, wherein the electrical motor is driving a sun gear, the first drive shaft is connected to a ring gear, and wherein the second drive shaft is connected to planetary gears. In such embodiment, the gear ratios of the planetary gear set may be designed such that no torque is transmitted through the planetary gear set when the electrical motor is deactivated. Further, the gear ratios of the planetary gear set may be designed such that the electrical motor is standing still when the first drive shaft and the second drive shaft are rotating at the same rotational speed. This means that possible loss of energy is reduced.

The differential mechanism may comprise a first planetary gear set connected to the first drive shaft, and a second planetary gear set connected to the second drive shaft, and said electrical motor may be connected to said first drive shaft and said second drive shaft by means of two gears rotating at different directions, wherein said gears are connected to each other by means of a shaft extending along the axle. Hence, the shaft connecting the gears is designed to stand still when the first drive shaft and the second drive shaft are rotating at the same rotational speed. Further, the shaft is designed to rotate at a speed being proportional to the differential rotational speed between the first drive shaft and the second drive shaft. Since the differential rotational speed at most times will be zero, or very close to zero, energy losses will be reduced.

The electrical motor may be connected to a clutch configured to decouple the rotational axis of the electrical motor from said differential mechanism. The clutch may be automatically decoupled when the rotational speed of said clutch is exceeding a predetermined threshold value. Alternately or additionally, the control means may be configured to cause automatic decoupling of said clutch based on an analysis of at least one of said plurality of variables representing the current vehicle state. This is advantageous in that the electrical motor is protected against overload, e.g. in transient vehicle conditions such as ESP intervention.

Said propulsion motor may be connected to a mechanical disconnect unit configured to disconnect the propulsion motor from said axle. Alternately or additionally, said control means may be configured to cause automatic actuation of said mechanical disconnect unit based on an analysis of at least one of said plurality of variables representing the current vehicle state, so as to disconnect the propulsion motor from said axle. This is further advantageous in that high losses, occurring from drag torque and field weakening during high speed, may be reduced or eliminated.

Said power electronics unit may be further configured to control the energy flow between the accumulator and the propulsion motor by supplying drive currents to said propulsion motor via the accumulator, and the power electronics unit may be further configured to allow reverse energy flow for charging the accumulator during braking of the vehicle. Regenerative braking may thus be used to decrease the energy consumption of the vehicle.

Said controller may be configured to execute a plurality of control programs, each control program being designed to control a respective aspect of the driving dynamics of the vehicle by appropriately calculating torque requests to said electrical motor, as represented by said one or more control signals to the power electronics unit, based on said plurality of variables representing the current vehicle state.

Said controller may further comprise arbitration functionality configured to handle concurrent torque requests from different ones of said control programs by prioritizing among such concurrent requests and permitting, combining or inhibiting each individual concurrent torque request as deemed most appropriate.

BRIEF DESCRIPTION OF THE DRAWINGS

Hereinafter, the invention will be described with reference to the appended drawings, wherein.

DETAILED DESCRIPTION OF THE INVENTION

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

Figure 1:
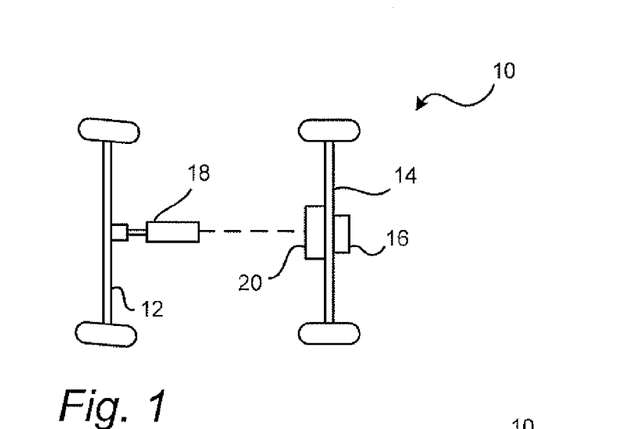
FIG. 1 is a schematic view of a vehicle according to an embodiment.
Figure 2:
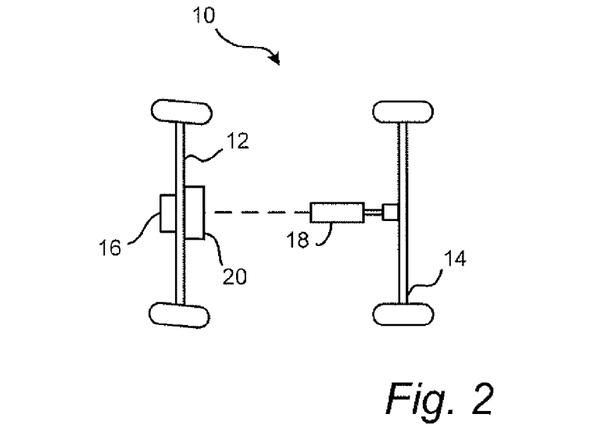
FIG. 2 is a schematic view of a vehicle according to another embodiment.
Figure 3:
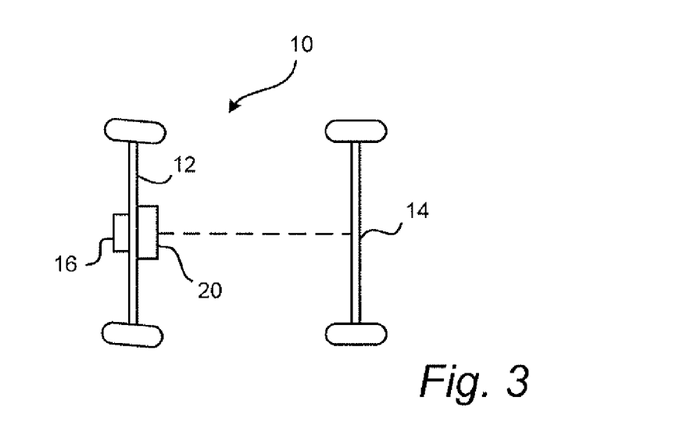
FIG. 3 is a schematic view of a vehicle according to a further embodiment.
Figure 4:
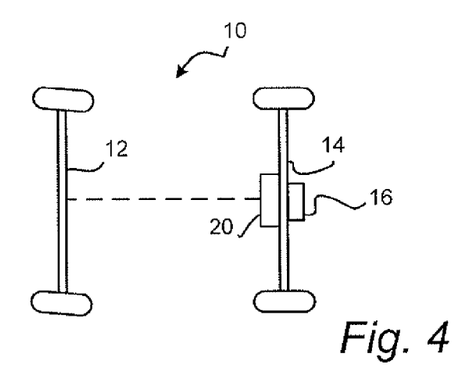
FIG. 4 is a schematic view of a vehicle according to a yet further embodiment.
Figure 5:
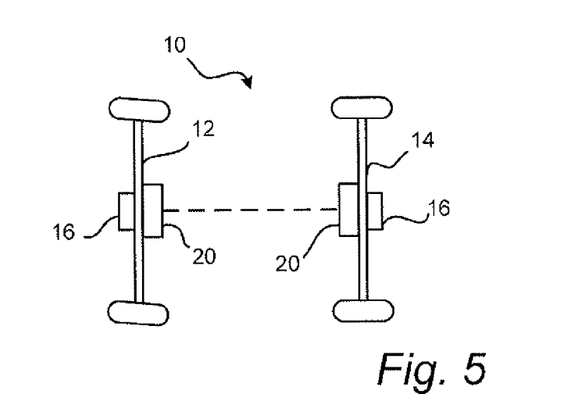
FIG. 5 is a schematic view of a vehicle according to another embodiment.

Examples of drive line configurations of a vehicle are shown in FIGS. 1 to 6. In these embodiments, the vehicle 10 has a front axle 12 being connected to a rear axle 14, and a torque vectoring device 16. In FIG. 1, the front axle 12 is driven by means of a transmission 18, and the rear axle 14 is driven by means of an electrical motor 20. The torque vectoring device 16 is arranged at the rear axle 14. In FIG. 2, a similar configuration is shown but here the rear axle is driven by means of a transmission 18, and the front axle is driven by means of an electrical motor 20. Consequently, the torque vectoring device 16 is arranged at the front axle. FIGS. 3 and 4 show configurations where the front axle 12 or the rear axle 14 is driven by an electrical motor 20, wherein the torque vectoring device 16 is arranged at the driven axle 12, 14. As a further example, FIG. 5 shows a configuration in which the front axle 12 and the rear axle 14 are driven by electrical motors 20.

Figure 6:
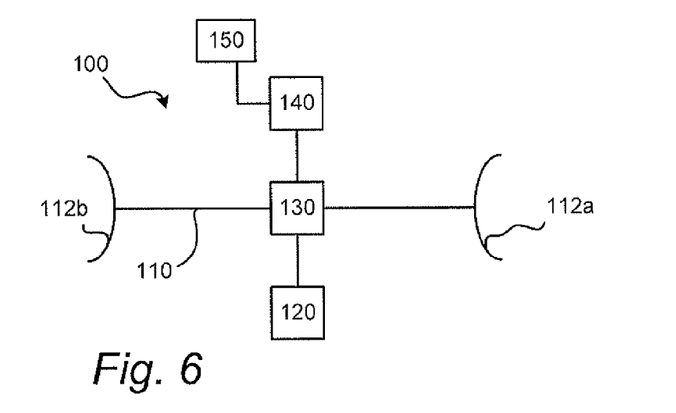
FIG. 6 is a schematic view of a torque vectoring device according to an embodiment.

With reference to FIG. 6, a basic setup of a torque vectoring device 100 is shown. A driving axle 110 of a vehicle is driven by means of a transmission 120 and has two wheels 112a, 112b connected to opposite ends of the axle 110. The transmission 120 is coupled to a differential mechanism 130 for allowing the wheels 112a, 112b to rotate at different velocities. An electrical motor 140 is connected to the differential mechanism 130, for providing a torque difference to opposite ends of the axle 110. A control means 150 is further connected to the electrical motor 140, and configured to calculate and transmit control signals to the electrical motor 140.

When the vehicle is travelling on a straight course, both wheels 112a, 112b will rotate at the same speed. In this situation, the electrical motor 140 will stand still. When the vehicle passes a surface having inhomogeneous friction, the torque vectoring device 100 may be used to enhance the traction potential of the driving axle 110. In such cases, the control means 150 sends a signal to the electrical motor 140 that will activate and apply a torque. Upon this, an increase of torque will be provided to one of the ends of the axle 110, and a corresponding torque decrease will be provided to the opposite end of the axle 110.

Figure 7:
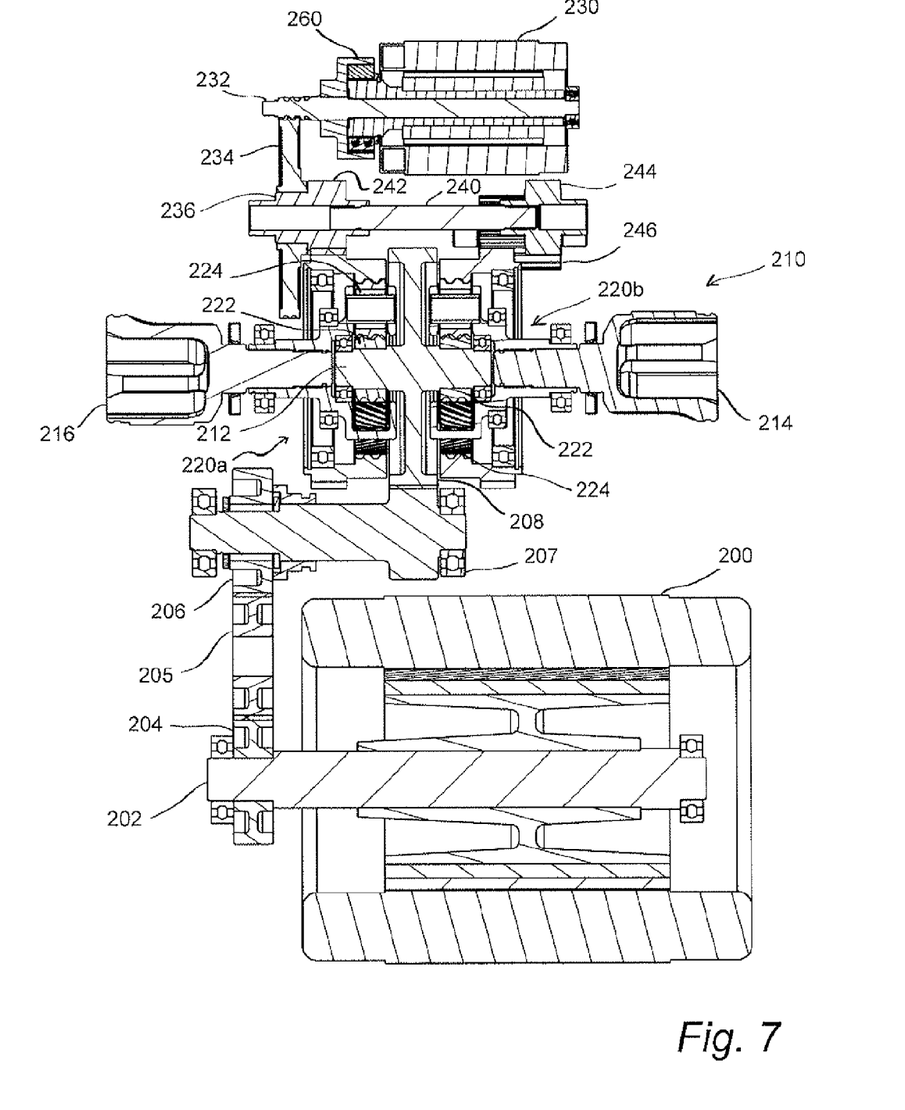
FIG. 7 is a cross sectional view of a torque vectoring device according to an embodiment.

An embodiment of a torque vectoring device is shown in FIG. 7. An electrical propulsion motor 200 transmits torque from a rotating shaft 202 to a driving axle 210 via gears 204, 205, 206, 207, 208. The driving axle 210 has a central portion 212, and first and second drive shafts 214, 216. The central portion 212 is connected to the first and second drive shafts 214, 216 by means of two planetary gears 220a, 220b. The central portion 212 is connected to sun gears 222, and the first drive shaft 214 and the second drive shaft 216 are connected to a plurality of planet gears 224. A ring gear 226 is provided with teeth on its outer surface, for engagement with a torque vectoring motor 230. The torque vectoring motor 230 is an electrical motor, which upon activation transmits a rotation to a rotating shaft 240 via an axis 232 and gears 234, 236. The rotating shaft 240 extends along the axis of the axle 210, and has a first gear 242 that is engaged with the ring gear 226 of the first planetary gear 220a, and a second gear 244 that is engaged with the ring gear of the second planetary gear 220b via an intermediate gear 246. When the torque vectoring motor 230 is activated, the motor 230 will provide a torque. Consequently, if the torque vectoring motor 230 is rotating, which will be determined by the actual state of the vehicle, opposite rotation of the ring gears 226 will be induced. Hence, an increase of torque is provided to one of the drive shafts 214, 216, and a decrease of torque is provided to the other of said drive shafts 214, 216 via the planetary gears 220a, 220b.

Optionally, the electrical propulsion motor 200 may be arranged on the central portion 212 of the driving axle 210. However, if the propulsion motor 200 is arranged at a distance from the axle 210 a number of advantages are obtained. For example, such arrangement will facilitate implementation of a mechanical disconnect functionality of the propulsion motor 200 which will be described in more detail later. Moreover, the planetary gears 220a, 220b can be made smaller as they do not need to correspond to the dimensions of the propulsion motor 200. A further advantage is that the cooling of the axle 210 is simplified, since access is readily allowed if the propulsion motor 200 is located at a distance from the axle 210.

Figure 8:
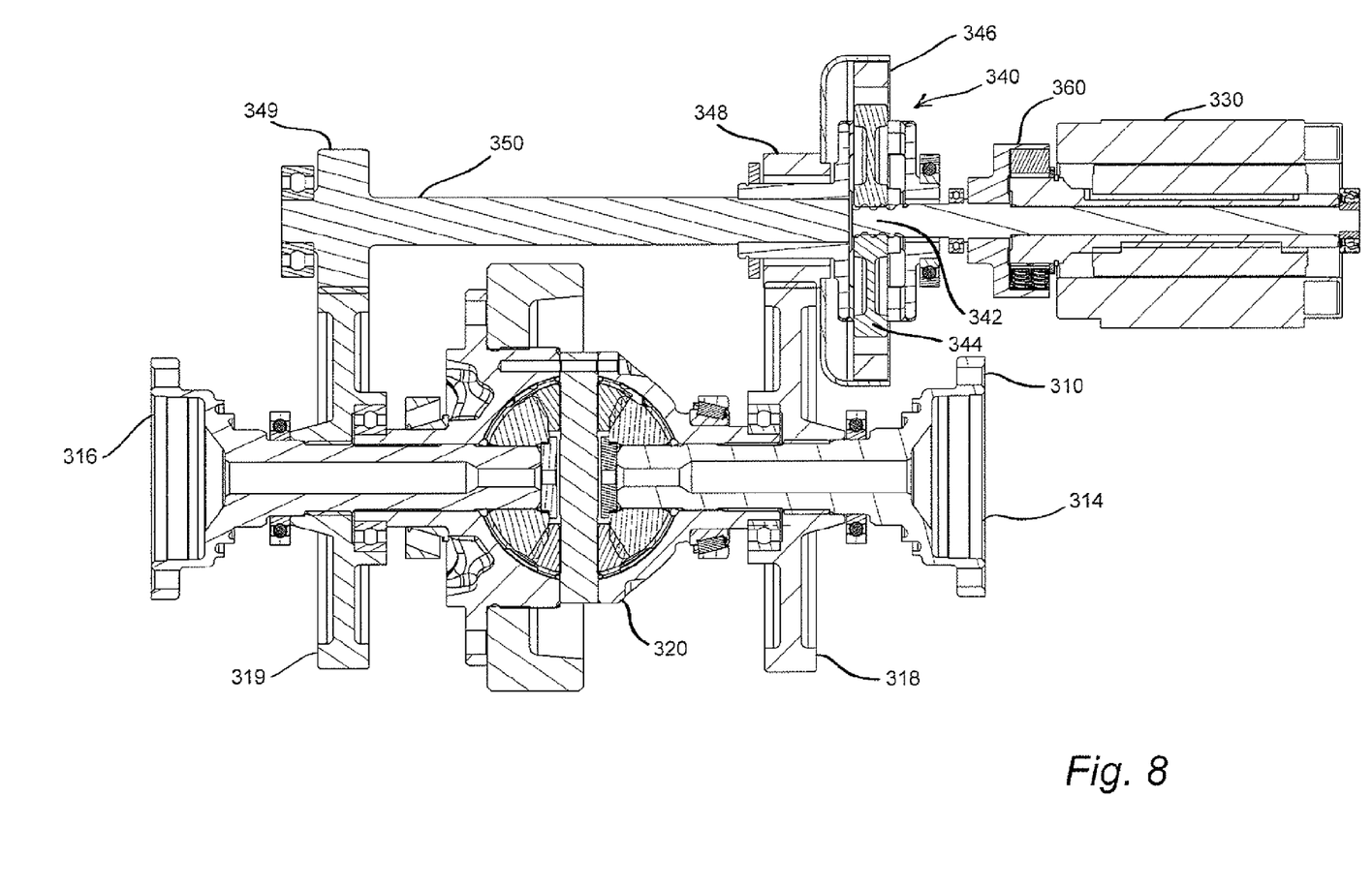
FIG. 8 is a cross sectional view of a torque vectoring device according to a further embodiment.

Another embodiment of a torque vectoring device is shown in FIG. 8. An electrical motor (not shown) transmits torque to a driving axle 310 via a differential unit 320. The torque is equally distributed between a first and a second drive shaft 314, 316 by the differential unit 320. The first drive shaft 314 is provided with a gear 318 having outer teeth and being arranged to rotate about the same central axis as the first drive shaft 314. The second drive shaft 316 is provided with a gear 319 having outer teeth and being arranged to rotate about the same central axis as the second drive shaft 316.

A torque vectoring motor 330 is provided to transfer torque from the first drive shaft 314 to the second drive shaft 316, or vice versa. The torque vectoring motor 330 is connected to the sun gear 342 of a planetary gear 340. The ring gear 346 is connected to the first drive shaft 314 by the gears 318, 348. Further, a planetary carrier 344 is connected to the second drive shaft 316 by means of a shaft 350 and gears 319, 349.

When the torque vectoring motor 330 is activated, the motor 330 will provide opposite torque to the gears 318, 319. Hence, an increase of torque is provided to one of the drive shafts 314, 316, and a decrease of torque is provided to the other of said drive shafts 314, 316 via the planetary gear set 340.

If the gear ratios of the gears 318, 348, and 319, 349, respectively, are matched to the gear ratio of the planetary gear set 340, the torque vectoring motor 330 will be standing still when the first and second drive shafts 314, 316 have equal rotational speed. If so, the following condition must be fulfilled:

$$\frac{i_1}{i_2} = 2 \cdot \frac{r_{01} + r_{02}}{r_{01} + 2 \cdot r_{02}},$$

where $i_1$ is the gear ratio between the gears 318, 348, $i_2$ is the gear ratio between the gears 319, 349, $r_{01}$ and $r_{02}$ are the reference radii of the planetary gear set 340. The above parameters may be chosen to achieve reasonable speed and torque requirements on the torque vectoring motor. For example, in a particular configuration $i_1$ is set to 3, $i_2$ is 2.67, $r_{01}$ is 8, and $r_{02}$ is 28.

In any of the embodiments mentioned, the torque vectoring motor 230, 330 may be a variable speed reversible electrical motor.

Figure 9:
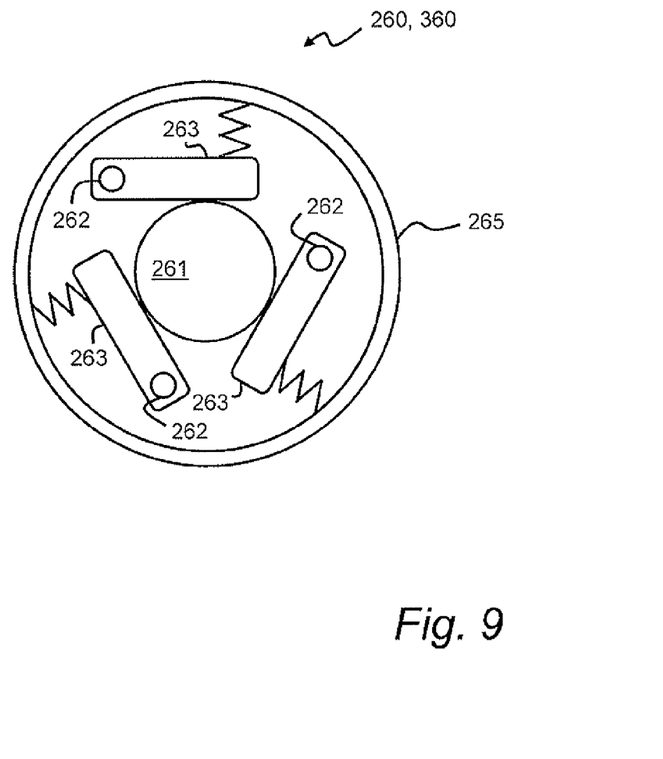
FIG. 9 is a cross sectional view of a clutch for use within a torque vectoring device according to an embodiment.

As is shown in FIGS. 7 and 8, the torque vectoring motor 230, 330 may be connected to a device 260, 360 providing mechanical protection against overload in transient vehicle conditions, such as ESP intervention. An automatic clutch 260, 360 is thus provided to disconnect the torque vectoring motor 230, 330 when the rotational speed exceeds a predetermined de-clutch limit. An example of such automatic clutch 260, 360 is presented in FIG. 9. The automatic clutch 260, 360 has a clutch drum 265 connected to the shaft 240, 350 and at least two lever arms 263 being connected to the drum 265 by pivot joints 262. A hub 261 is connected to the motor 230, 330 such that rotational speeds below the de-clutch limit are transferred from the hub 261 to the drum 265 via the friction between the lever arms 263 and the hub 261. When the rotational speed reaches the de-clutch limit, the centrifugal force acting on the lever arms 263 will exceed a spring force, and no torque can thus be transferred. Hence, the centrifugal clutch 260, 360 will disconnect the torque vectoring motor 230, 330 at a certain rotational speed to protect it from over speeding. In another example, the control means 150, 420, 430, 440 is configured to cause automatic decoupling of the clutch 260, 360 based on an analysis of at least one of the plurality of variables 442, 444 representing the current vehicle state. For example, automatic decoupling of the clutch 260, 360 may be based on an analysis of the rotational speed of the electrical motor 230, 330, wherein the rotational speed is measured by at least one sensor providing the measured value as one of the variables 442, 444.

In a yet further embodiment, a mechanical disconnect unit of a propulsion motor 200 is provided. Such disconnect unit can be adapted to disconnect the propulsion motor at a certain speed by either a centrifugal disconnect unit similar to the clutch described with reference to FIG. 9, or e.g. by a dog clutch or a limited slip clutch being controlled by a microprocessor. Depending on the specific type of the propulsion motor, there may be high losses at high speeds coming from drag torque and field weakening. By disconnecting the propulsion motor, such losses can be minimized and hence the fuel saving potential may be maximized. When the propulsion motor is disconnected, the torque vectoring motor may still be used and thus always be utilized to influence vehicle stability. In a specific embodiment, the control means 150, 420, 430, 440 is configured to cause automatic actuation of the mechanical disconnect unit based on an analysis of at least one of said plurality of variables 442, 444 representing the current vehicle state, so as to disconnect the propulsion motor 20, 200, 400 from the axle 110, 210, 310, 402.

A speed gear may be arranged between the propulsion motor 200 and the driving axle 110, 210, 310. The speed gear, such as a transmission known per se, is thus used for converting the speed and torque of the propulsion motor. This is advantageous in that the electrical propulsion motor 200 is allowed to operate at its optimum speed interval, thus reducing the overall energy consumption of the vehicle.

For all embodiments described so far, it is assumed that the torque vectoring motor 230, 330 receives control signals from a control means arranged within the vehicle. The control means is configured to receive a plurality of vehicle variables and to determine a corresponding output signal that is transmitted to the torque vectoring motor. For example, the control means comprises a vehicle network communication interface configured to collect the plurality of vehicle variables, a controller configured to receive said vehicle variables and calculate the output signal, and a power electronics unit configured supply drive currents to the electrical motor in response to the output signal for controlling the energy flow between an electrical power source and the electrical motor. The electrical power source may for example be an electrical accumulator like a battery or fuel cell, or an electrical generator. In one particular embodiment, in which the torque vectoring device 100, 200, 300 is implemented in a vehicle being at least partly driven by a combustion engine, the electrical power source may be a generator driven by said combustion engine. In a further embodiment, the generator may be driven by a separate combustion engine. However, in the embodiment described in the following paragraphs, the electrical power source is an electrical accumulator.

Figure 10:
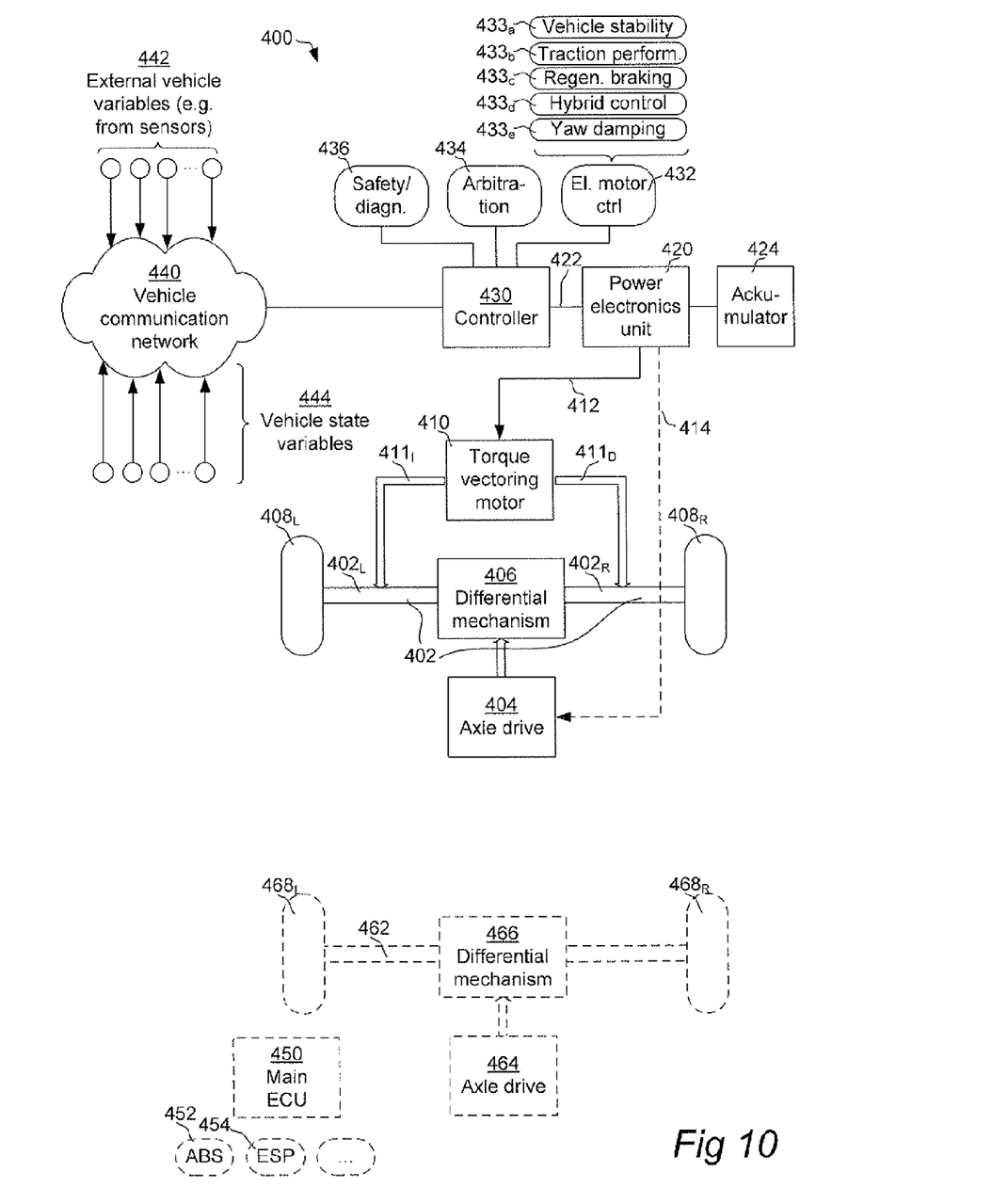
FIG. 10 is a block diagram illustrating, on a schematic level, how a torque vectoring device of FIGS. 7-8 can be controlled by a controller device in order to regulate the dynamics of a vehicle.

A description of how a torque vectoring device according to any of the embodiments referred to above may be applied in a modern road vehicle, such as a car (automobile), will now follow with reference to FIG. 10. As seen in FIG. 10, a car 400 comprises a first axle 402 which is driven by a first axle drive mechanism 404. As is well known per se, a differential mechanism 406 on the first axle 402 allows a left drive shaft 402L of the first axle 402, and a left wheel 408L mounted thereon, to rotate at a different speed than a right drive shaft 402R of the first axle 402, and a right wheel 408R mounted thereon. A torque vectoring motor 410—which for instance may be implemented by the electrical motor 140, 230 or 330 referred to above—is arranged to provide a torque increase 411I on one of the drive shafts 402L, 402R and a corresponding torque decrease 411D on the other one of the drive shafts 402R, 402L, as has already been explained with reference to the previous drawings. In FIG. 10, the torque increase 411I is applied to the left drive shaft 402L, whereas the torque decrease 411D is applied to the right drive shaft 402R. However, by reversing the rotation of the torque vectoring motor 410, the situation will be the opposite.

The torque vectoring motor 410 is driven by drive currents 412 which are supplied from an electrical power source in the form of an accumulator 424 via a power electronics unit 420. In turn, the power electronics unit 420 is controlled by means of one or more control signals 422 from a torque vectoring controller 430. The amplitude and polarity of the drive currents 412 will determine the rotational speed and direction of the torque vectoring motor 410 and, consequently, the magnitude and direction of the torque increase/decrease 411I/411D applied to the left and right drive shafts 402L, 402R.

Like any electrical machine, the torque vectoring motor 410 may not only act as a motor but may also be driven as a generator to transform mechanical energy from the rotation of the first axle 402 into electrical energy to be received and stored in the accumulator 424. This may advantageously be used for regenerative braking in order to reduce the electrical energy consumption of the vehicle and to extend the recharging periodicity of the accumulator 424. To this end, the power electronics unit 420 is adapted to closely control the flow of electrical energy from the accumulator 424 to the torque vectoring motor 410 (when operating as a motor), and to the accumulator 424 from the torque vectoring motor 410 (when operating as a generator), respectively. The power electronics unit 420 therefore comprises high-efficiency solid-state circuitry capable of accurate control of the drive currents 412 to the torque vectoring motor 410 (motor case), and of the generated currents fed to the accumulator 424 (generator case). Accurate control is particularly important in the latter case, since the capacity, life-time and safety of the accumulator 424 (for instance in the form of one or more state-of-the-art, high-energy lithium batteries) may otherwise be jeopardized.

In embodiments of the vehicle 400, the first axle drive mechanism 404, too, may comprise an electrical motor. In such a case, also this electrical motor 404 may be driven by drive currents 414 from the power electronics unit 420, and, conversely, also the electrical motor 404 may be used as a generator for charging the accumulator 424 under the control of the power electronics unit 420.

As already mentioned, the power electronics unit 420 is in turn controlled by means of one or more control signals 422 from the torque vectoring controller 430. The torque vectoring controller 430, which may be identical to the aforementioned control means 150, is preferably implemented as a microprocessor (PLC, CPU, DSP) or another suitable processing device technology, such as FPGA or ASIC, or any other suitable digital and/or analogue circuitry capable of performing the intended tasks. In order to be able to exercise the control of the torque vectoring motor 410 and generate the control signals 422, the torque vectoring controller 430 is programmed or otherwise provided with electrical motor control functionality 432.

The electrical motor control functionality 432 of the torque vectoring controller 430 is capable of real-time calculation of various control variables, which in turn determine the control signals 422, based on the current vehicle state. To this end, vehicle state data in the form of a plurality of external vehicle variables 442 is collected by a plurality of sensors distributed across the vehicle. The external vehicle variables 442 are continuously broadcasted on a vehicle communication network 440 and are therefore made accessible to the electrical motor control functionality 432 via this network. The vehicle communication network 440 may for instance be compliant with an industry standard protocol such as CAN ("Controller Area Network") and/or FlexRay.

In addition, vehicle state data in the form of vehicle state variables 444 may also be also received by the electrical motor control functionality 432 over the network 440. Such vehicle state variables 444 may be produced by other units in the vehicle, such as by a main electronic control unit (ECU) 450, an anti-lock braking system (ABS) 452 or an electronic stability program (ESP) 454. The ECU 450, ABS 452 and ESP 454 may be provided for the purpose of controlling a second drive axle 462 having its own axle drive mechanism 464 (such as a combustion engine, for instance), differential mechanism 466 and pair of wheels 468L, 468R. By receiving and using such vehicle state variables 444 from other units in the vehicle, the electrical motor control functionality 432 may make sure that the torque vectoring motor 410 (and first axle drive mechanism 404, when being an electrical motor) is optimally driven in view of energy consumption, service life, vehicle stability, traction performance, and driving safety.

Conversely, using the vehicle communication network 440, the torque vectoring controller 430 may be adapted to inform or instruct other units in the vehicle concerning control decisions it has made for the torque vectoring motor 410 (and the first axle drive mechanism 404, when being an electrical motor). For instance, the control of the second axle drive mechanism 464 in the form of a combustion engine may benefit from taking such information or instructions into account, since it may reduce the fuel consumption. Further, the ESP functionality 454 may be improved and made more accurate by this kind of data from the torque vectoring controller 430.

Thus, by controlling a torque vectoring system together with other systems, for example ESP 454, synergic effects can be reached. A torque vectoring system can be controlled at lower differential speeds, smoother and more accurately than an ESP can control by using the engine and brake system. Therefore control signal(s) can be broadcasted to the ESP 454, informing about actions performed by the torque vectoring system or requesting a performance from the ESP system.

For optimal fuel consumption in a hybrid vehicle the engine and the electrical driven axle should be controlled in a manner to reach minimum fuel consumption. This can be done by having an optimization controller in the electronic module in the electrical axle broadcasting signals requesting action from the engine or sending a request from the engine controller to the electrical axle.

Examples of control variables provided to and/or calculated by the electrical motor control functionality 432 from the received vehicle state data 442, 444 may include driver's acceleration or deceleration request (i.e. acceleration or brake pedal position), wheel speeds, steering wheel angle, yaw rate, lateral acceleration, estimated vehicle speed, actual tire slip values, road friction utilization, level of over/under steer, and engine/motor torque and speed (for axle drive mechanism 404 or 464). The electrical motor control functionality 432 may preferably be divided into a plurality of control programs 433a ... 433e. Each control program is designed to control a respective aspect of the driving dynamics of the vehicle by appropriately calculating torque requests to the torque vectoring motor 410, as represented by the control signals 422 to the power electronics unit 420, so that the torque vectoring motor 410 will be actuated accordingly to obtain the desired change in torque distribution between the left and right drive shafts 402L, 402R. As seen in FIG. 10, non-limiting examples of control programs included in the electrical motor control functionality 432 are: Vehicle stability 433a, Traction performance 433b, Regenerative braking 433c, Hybrid control 433d, and Yaw damping 433e. In the disclosed embodiment, all or at least some of these control programs 433a ... 433e are executed in parallel to each other. In other words, the torque vectoring controller 430 is capable of running the control programs 433a ... 433e in a multi-tasking manner. Having a plurality of concurrently running control programs 433a ... 433e provides a broad, flexible and extensive control of the driving dynamics of the vehicle, which truly is of a complex nature.

In addition to the electrical motor control functionality 432, the torque vectoring controller 430 is programmed or otherwise provided with arbitration functionality 434 and safety/diagnostics functionality 436.

The purpose of the arbitration functionality 434 is to handle situations where torque requests are made concurrently from different ones of the control programs 433a ... 433e. Since each control program determines its torque requests in consideration of the particular needs that the program in question is tasked to handle, there will be situations where two or more concurrent torque requests are not mutually compatible and cannot all be granted. The arbitration functionality 434 is designed to prioritize among such concurrent requests and to permit, combine or inhibit each individual request as deemed most appropriate. Hence, the arbitration functionality 434 will prevent potentially dangerous situations from occurring when concurrent torque requests are in conflict with each other, without unduly restricting the operability of each individual control program. The arbitration functionality 434 may alternatively or additionally be designed to receive and act upon arbitration instructions from another unit in the vehicle (such as main ECU 450), instead of making the arbitration decisions itself. Furthermore, when the first axle drive mechanism 404 comprises an electrical motor driven by drive currents 414 from the power electronics unit 420, the arbitration functionality 434 may advantageously be adapted to handle arbitration also for requests directed to the electrical motor 404.

The purpose of the safety/diagnostics functionality 436 is to handle errors among incoming vehicle state data 442, 444, for instance plausibility checks and offset compensations. Moreover, the safety/diagnostics functionality 436 supervises the status and operation of the torque vectoring motor 410, power electronic unit 420, accumulator 424 as well as the torque vectoring controller 430 itself, and is designed to broadcast diagnostic information to other units in the vehicle (for instance main ECU 450).

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It will be appreciated that the embodiments described in the foregoing may be combined without departing from the scope as defined by the appended patent claims.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

According to a further inventive concept in the technical field of torque vectoring, a device is hereby presented. The device comprises a differential mechanism arranged on an axle having a first drive shaft and a second drive shaft, a torque generating unit being connectable to said axle for torque vectoring between said first drive shaft and said second drive shaft, and a control means connected to said torque generating unit for determining the amount of torque that should be applied for reducing the differential rotational speed between the first drive shaft and the second drive shaft. In a preferred embodiment of this further inventive concept, the torque generating unit is a braking unit such as a friction brake, a viscous coupling unit, a dog clutch, or a disc clutch. In a particular embodiment, the torque generating unit is connected to a control means configured to receive a plurality of variables representing the current vehicle state and to determine an output signal being dependent on said variables, wherein said output signal is supplied to said torque generating unit for reducing the differential rotational speed between the first drive shaft and the second drive shaft.

With reference to FIGS. 7 and 8, the following modifications are possible for providing a torque vectoring device according to the further inventive concept presented above. The torque generating unit, i.e. the brake or the clutch, may be arranged on the shaft 232 (FIG. 7) or 342 (FIG. 8) instead of or in line with the electrical motor 230, 330. As the torque generating unit is also connected to a stationary portion, the rotational speed of the shaft 232, 342 may be reduced. If the electrical motor 230, 330 is replaced, the clutch 260, 360 may also be removed since there is no longer a need for limiting the rotational speed.

A viscous coupling unit may provide a braking torque that is dependent on the rotational speed of the shaft 232, 242. A dog clutch may provide a binary disconnect or connect coupling, i.e. the shaft 232, 242 is either free to rotate or locked. A friction brake or a disc clutch may provide continuous control of the torque.

For all such torque generating units, the rotational speed of the shaft 232, 242 may only be reduced or eliminated. Consequently, the differential rotational speed between the wheels of the vehicle may only be reduced or eliminated. This is contrary to the functionality when an electrical motor is implemented, which allows for increase of differential rotational speed between a first drive shaft and a second drive shaft.

However, a torque generating unit such as a brake or a clutch may be implemented together with a torque vectoring motor. In such embodiment, the device may provide a braking torque being higher than the capability of the electrical motor alone.

What is claimed is:

1. A device for torque vectoring in a wheeled vehicle, comprising:
    a differential mechanism arranged on an axle having a first drive shaft and a second drive shaft,
    an electrical power source connected to an electrical motor, said electrical motor being connectable to said axle for torque vectoring between said first drive shaft and said second drive shaft, and comprising an accumulator,
    an electrical propulsion motor arranged to drive said axle,
    control means connected to said power source and configured to receive a plurality of variables representing the current vehicle state and to determine drive currents being dependent on said variables, said control means comprising
        a vehicle communication network configured to collect the plurality of the variables,
        a controller configured to receive said variables and calculate one or more control signals, and
        a power electronics unit configured to receive said one or more control signals and to control energy flow between the accumulator and the propulsion motor by supplying drive currents to said propulsion motor via the accumulator, and
    said controller being configured to execute a plurality of control programs, each control program being designed to control a respective aspect of driving dynamics of the vehicle by appropriately calculating torque requests to said electrical motor, as represented by the one or more control signals to the power electronics unit, based on said plurality of variables representing the current vehicle state,
    wherein said drive currents are supplied to said electrical motor from said power source for introducing a torque increase to either one of said first or second drive shafts and a corresponding torque decrease to the other one of said first or second drive shafts,
    wherein said differential mechanism comprises a first planetary gear set connected to the first drive shaft, and a second planetary gear set connected to the second drive shaft, and
    wherein said electrical motor is connected to said first drive shaft and said second drive shaft by means of two gears rotating at different directions, wherein said gears are connected to each other by means of a shaft extending along the axle.

2. The device according to claim 1, wherein said electrical propulsion motor is arranged at said axle such that a rotor of said electrical propulsion motor is rotating around an axis parallel to an axis of said axle.

3. The device according to claim 1, wherein said power electronics unit is further configured to allow reverse energy flow for charging the accumulator during braking of the vehicle.

4. The device according to claim 1, wherein the electrical motor is connected to a clutch configured to decouple the rotational axis of the electrical motor from said differential mechanism.

* * * * *